United States Patent [19]

Yardley et al.

[11] Patent Number: 4,694,651
[45] Date of Patent: Sep. 22, 1987

[54] BRAKE MASTER CYLINDER

[75] Inventors: Alfred Yardley, Kidderminster; John F. Pickering, Warwickshire, both of England

[73] Assignee: Lucas Industries Limited, Birmingham, England

[21] Appl. No.: 247,619

[22] Filed: Mar. 25, 1981

[30] Foreign Application Priority Data

Apr. 29, 1980 [GB] United Kingdom ............... 8014024
Jun. 24, 1980 [GB] United Kingdom ............... 8020621

[51] Int. Cl.⁴ .............................................. B60T 11/08
[52] U.S. Cl. ................................... 60/578; 137/493.2; 137/513.5
[58] Field of Search ................ 60/578, 588, 589, 592, 60/574, 585; 137/513.5, 493.2

[56] References Cited

U.S. PATENT DOCUMENTS

| | | | |
|---|---|---|---|
| 2,374,235 | 4/1945 | Roy | 60/578 |
| 2,580,850 | 1/1952 | Seppmann | 60/578 |
| 2,722,289 | 11/1955 | Girard | 137/493.2 |
| 3,145,730 | 8/1964 | Presnell | 137/493.2 |
| 3,152,606 | 10/1964 | Vedder | 137/493.2 |
| 3,199,299 | 8/1965 | Moyer | 60/588 |
| 4,038,824 | 8/1977 | Okamoto | 137/513.5 |
| 4,086,770 | 5/1978 | Shaw | 60/574 |
| 4,133,178 | 1/1979 | Brooks, Sr. | 60/578 |
| 4,147,270 | 4/1979 | Brandon, Jr. | 60/592 |
| 4,170,386 | 10/1979 | Shutt | 60/574 |
| 4,208,881 | 6/1980 | Brademeyer | 60/588 |
| 4,249,380 | 2/1981 | Melendy | 60/578 |
| 4,329,846 | 5/1982 | Gaiser | 60/578 |

FOREIGN PATENT DOCUMENTS 1048494 1/1959 Fed. Rep. of Germany ........ 60/585
112353 9/1981 Japan .

Primary Examiner—Abraham Hershkovitz
Attorney, Agent, or Firm—Scrivener and Clarke

[57] ABSTRACT

In a master cylinder of the quick-fill type, communication between the quick-fill chamber (8) and the reservoir (13) is controlled by a valve assembly comprising a pressure responsive valve which opens when the pressure in the quick-fill chamber (8) reaches a predetermined level, and a one-way valve (20, 22) which allows free flow of fluid from the reservoir to the quick-fill chamber. The valve member (20) and seat (15) of the pressure responsive valve have confronting surfaces which define between them, when the valve is closed, a restrictive passage for pressure equalization purposes, and any dirt becoming trapped between the surfaces is washed away by the fluid flow on opening of the valve.

7 Claims, 4 Drawing Figures

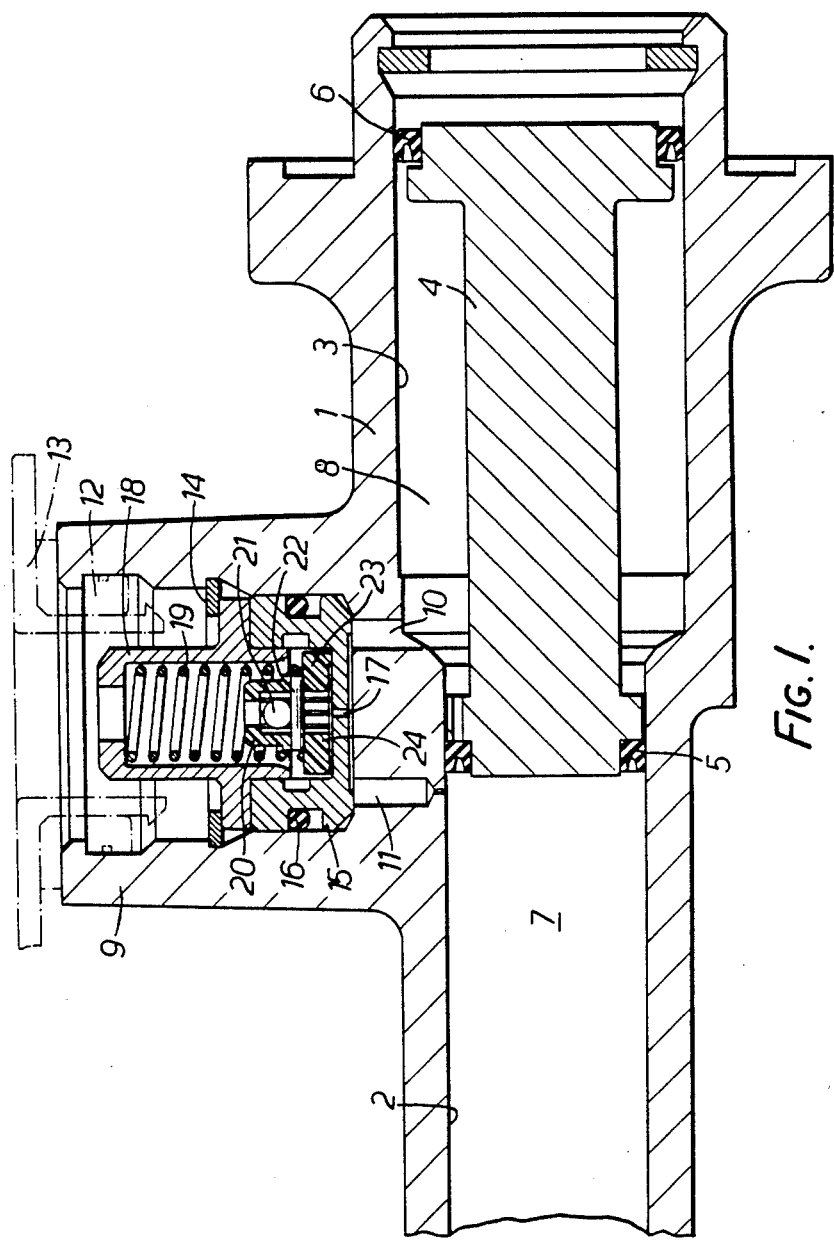

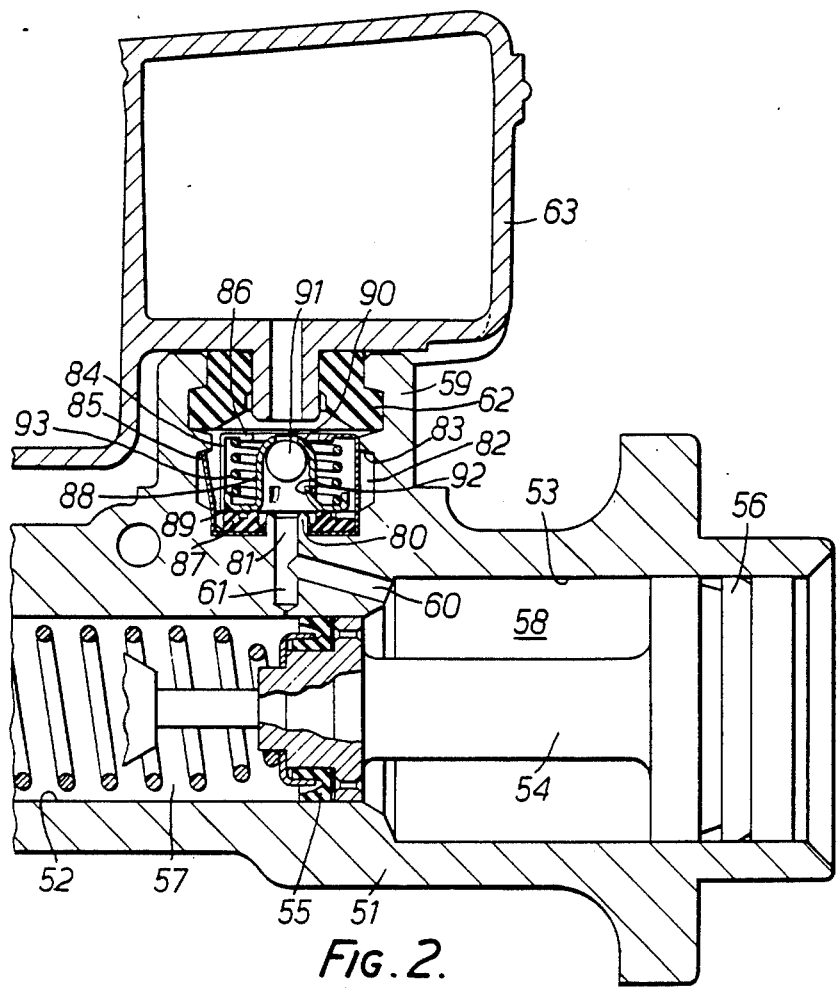
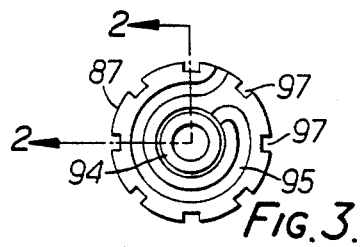
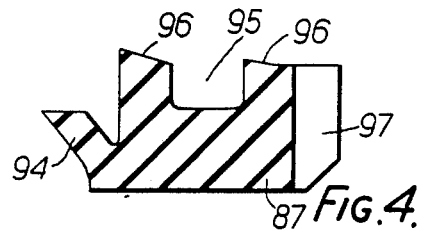

BRAKE MASTER CYLINDER

This invention is concerned with a master cylinder for an hydraulic braking system, and in particular with a master cylinder of the so-called "quick take-up" or "quick fill" type.

A quick-fill master cylinder is one which on actuation initially supplies a large amount of fluid to the braking circuit so that clearances are rapidly taken up, and the brake shoes or pads are placed in contact with the associated brake drums or discs ready to apply the braking forces, with only minimal travel of the brake pedal itself. Generally, a quick fill master cylinder has a stepped bore and a piston with two head of different diameter sliding in respective parts of the bore. A large volume chamber is defined between the two piston heads and the bore while a lower volume chamber is defined within the bore in front of the smaller piston head and has an outlet leading to the brake circuit. When the brake pedal is depressed, the piston is urged forwards along the bore causing the volume of the large chamber to reduce, and braking fluid to be transferred from it to the lower volume chamber and hence to the braking circuit for taking up the clearances. Once the clearances have been taken up, the rise in pressure in the lower volume chamber prevents more fluid being transferred to it from the larger chamber, and instead on continued forward movement of the piston fluid is allowed to pass from the latter chamber to a reservoir of the master cylinder via a pressure responsive valve device. The piston movement pressurises the fluid in the lower volume chamber, which pressure is transmitted to the brake cylinders to apply the brakes.

Quick fill master cylinders have the advantages of reducing the length of the master cylinder and brake pedal travel and of making a booster unnecessary in at least some applications.

In any braking circuit the pedal travel required to achieve brake application should be the same irrespective of the rate at which the pedal is depressed. In addition, it is essential that the pressure chamber of the master cylinder should be allowed to "breathe", i.e. have some fluid communication with the reservoir when in its normal brakes-off condition, for example to allow for thermal expansion and contraction of the fluid in the braking circuit due to fluctuations in the ambient temperature when the vehicle is parked. Furthermore, in the case of quick fill master cylinders it is preferable that the pressure in the quick-fill, i.e. larger volume chamber be allowed to decay through a restricted passage communicating the chamber with the reservoir so that brake application is not resisted by this pressure causing the pedal to have a strange feel to it.

The known quick-fill master cylinders fail to achieve all the above mentioned qualities and as a result all have their drawbacks. Typical of the prior art are the quick-fill master cylinders of U.S. Pat. Nos. 4,086,770, 4,133,178 and 4,208,881. In the master cylinder disclosed in the first of these specifications, the quick-fill chamber communicates with the reservoir through a valve which is opened when the pressure in the low volume pressurising chamber reaches a particular level, and through a one-way valve which is arranged to permit return flow of fluid to the quick-fill chamber on the return stroke of the piston. A compensation port normally communicates the pressurising chamber with the reservoir to allow it to breathe. This master cylinder has two main disadvantages. Firstly, upon a very rapid actuation the pressure in the pressurising chamber can rise to a level at which the valve is opened before any pressure has been transmitted to the brakes themselves. As a result the fluid from the quick fill chamber passes to the reservoir and the quick fill operation is lost so that pedal travel is increased. Secondly, the compensation port is quickly placed in communication with the quick-fill chamber even at slow actuation rates, with the result that on slow actuation the fluid passes from the quick-fill chamber to the reservoir via the compensation port and once again the quick-fill operation is lost and pedal travel increased.

In the master-cylinder of U.S. Pat. No. 4,133,178 the quick-fill chamber and compensation port communicate with the reservoir through a common passage which includes a valve and a restriction. In the normal brakes-off condition the piston acts on a stem of the valve to hold it open so that the pressurising chamber can breathe. When the piston moves forwards the valve closes under the action of a spring to allow sufficient pressure to be created in the quick-fill chamber to transfer fluid into the pressurising chamber. On a fast actuation the valve may not close due to the rapid pressure increase, but the restriction in the passage ensures that fluid is transferred to the pressurising chamber. The master cylinder still has its disadvantages however. There is no possibility for the pressure in the quick-fill chamber to decay so that resistance is felt at the pedal, especially upon slow actuation. In addition the piston displacement needed to close the valve leads to considerable lost travel of the pedal. In U.S. Pat. No. 4,208,881 an attempt has been made to avoid these drawbacks. The valve stem has been eliminated and a small bore passageway formed in the valve seat member to by-pass the valve. The restrictive passageway means that the pressurising chamber can still breathe, and also allows the pressure in the quick-fill chamber to decay under static pressure conditions. However, in order to be sufficiently restricting, the passageway must be so narrow that it is easily blocked by dirt particles. This drawback cannot be removed by making the passageway bigger because then, on slow actuation, the fluid from the quick-fill chamber would flow to the reservoir through the passageway and the quick fill operation would be lost.

The present invention aims at reducing the drawbacks of the known quick-fill master cylinders and, accordingly, provides a master cylinder of the quick-fill type comprising a body having a stepped bore, a piston having opposite ends slidable in respective portions of the bore and defining therewith a low volume pressure chamber and a larger volume quick-fill chamber, a port in the body open to the quick-fill chamber and a compensation port in the body for communicating with the pressure chamber, a reservoir connected to said ports, and valve means controlling communication between the reservoir and the ports, the valve means including a pressure responsive valve arranged to open when the pressure in the quick-fill chamber reaches a predetermined level, and a one-way valve permitting free flow of fluid in the direction from the reservoir to the quick-fill chamber, the pressure responsive valve comprising a valve member and seat having co-operating confronting surfaces which move apart when the valve opens for fluid to flow therebetween in a direction substantially parallel to the said surfaces, and a restricting by-pass passage being defined between said confronting surfaces when the pressure responsive valve is closed.

A master cylinder of this construction has the advantage that any dirt particles becoming trapped between the confronting surfaces which define between them the restricted passage, will be washed clear by fluid flowing under pressure to the reservoir on brake application at a sufficient rate to lift the valve member off the seat member.

In one embodiment of the invention the pressure responsive valve is formed by a moulded plastics valve member having a substantially flat end surface adapted to cooperate with the bottom of a cup-shaped seat member received in and sealed to a boss on the master cylinder body. The valve member has a bore in which a ball is held trapped and cooperates with an annular seat provided on the valve member to define the one-way valve. The restricted passage is defined by three short feet on the flat end surface of the valve member which hold this surface at a small clearance of about 0.1 mm from the surface of the cup-shaped seat member. When the valve member lifts off its seat the flow of fluid washes the surfaces free of any trapped particles whereby the restricted passage is automatically self-cleaning.

During normal driving most brake applications are at a slow rate, and if dirt should become trapped between the valve member and its seat so that they do not close together properly, a higher rate of application may be need to instigate the self-cleaning action for the restricted passage. As a result, for a few brake applications at least the pedal feel and travel could be different to that normally experienced by the driver, due to fluid passing at a higher rate than usual from the quick-fill chamber to the reservoir via the restricted passage. Of course, any variations in pedal characteristics during driving are preferably avoided.

This possible drawback can be avoided if one of the two confronting surfaces between which the restrictive passage is defined, is provided by an element of elastomeric material.

When the two components of the pressure responsive valve are urged together to define the restricted passage any dirt particles between their contacting surfaces will be pressed down into the elastomeric material, due to its resilient nature, and will not prevent the components coming together into correct sealing engagement to form the restricted passage. The self-cleaning, however, is not lost since the dirt particles can be washed clear when the components are subsequently opened apart again, e.g. upon brake application at a high rate.

As the sealing engagement between the components is not impeded by any dirt becoming trapped between them, the pedal travel will always remain constant for all rates of pedal depression.

Generally speaking it will not be satisfactory to provide the restricted passage by forming a groove in one of the confronting surfaces. In order to be sufficiently restrictive the groove would need to have a small cross-section which means, firstly, that it would easily become blocked by solid dirt particles and, secondly, such narrow grooves of accurately controlled size are costly to machine.

However, with a master cylinder according to the present invention it has been found possible to employ a groove as the restricted passage without suffering the above disadvantages. Because the passage is defined between confronting surfaces a comparatively long groove of large cross-section can be provided in one of the surfaces and have the necessary flow resistance, the groove following a generally spiral path which preferably includes at least one substantially complete turn.

If the master cylinder includes an element of elastomeric material as mentioned above, the spiral groove is conveniently formed in this element during moulding.

A better understanding of the invention will be had from the following detailed description which is given with reference to the accompanying drawings, in which:

FIG. 1 shows in section part of a master cylinder embodying the invention;

FIG. 2 is a cross-section through part of another master cylinder embodying the invention, the section through the elastomeric seal being taken along the line 2—2 in FIG. 3;

FIG. 3 is a plan view of the elastomeric seal; and

FIG. 4 is a section through the seal member shown on an enlarged scale.

In FIG. 1 numeral 1 designates the master cylinder body in which there is provided a stepped bore with larger and smaller diameter portions 2, 3 separated by a shoulder. A piston 4 received in the bore carries a seal 5 at its forward end sliding in bore portion 2, and a second seal 6 at its rear end sliding in bore portion 3. A low volume pressurising chamber 7 is defined in bore portion 2 in front of the piston 4 and a larger volume, quick-fill chamber 8 is defined around the piston 4 between its seals 5, 6. The body 1 has an integral boss 9, the interior of which communicates with the quick-fill chamber 8 through a port 10 and with the pressurising chamber 7, when the piston is in the normal brakes-off position illustrated, through a compensation port 11. Connected to the outer end of the boss 9 by a seal 12 is a reservoir 13. A valve assembly is located in the boss 9 and retained therein by a circlip 14. The assembly comprises a cup-shaped seat member 15 sealed to the boss 9 around its periphery by a seal 16 and including a small central hole 17 in its bottom wall and a recess in the under surface of the bottom wall, which forms a passage connecting the ports 10 and 11 with the hole 17.

A cap 18 having a hole in its end wall rests on the seat member 15 and supports one end of a spring 19, the other end of which acts on a valve member 20. The valve member which may be moulded from plastics material has a bore in which a ball 21 is held trapped by a transverse pin 22, longitudinal grooves being formed in the bore to assist flow of fluid past the ball 21. The ball co-operates with the upper end of the valve member under the action of pressure developed by fluid flow from the master cylinder chamber to the reservoir thereby forming a one-way valve controlling flow of fluid through the bore of member 20. The ball is sufficiently flow-sensitive to be urged to the closed position at all actuation rates and yet can easily move downwardly to permit fluid to flow to the master cylinder from the reservoir 13. The bottom surface of valve member 20 is flat and is formed with three short feet 23 which are spaced apart around its periphery and normally hold this surface at a small clearance, for example approximately 0.1 mm, from the bottom wall of the seat member 15, so as to define a restricted passage 24 through which ports 10 and 11 communicate with the reservoir 13.

At a normal actuation rate, as the piston 4 moves forward from the position illustrated, the volume of the quick-fill chamber 8 decreases and fluid is transferred to the pressurising chamber 7 past the seal 5, since the pressure is not high enough to open the pressure responsive valve by lifting valve member 20 off its seat 15 against the force of the spring 19. When the pressure in chamber 7 increases to prevent further transfer of fluid into this chamber, the valve 20 opens so that the fluid can then flow to the reservoir 13 from the quick-fill chamber. In the event of a fast actuation due to an operator stamping on the pedal, the small hole 17 in seat member 15 prevents the valve 20 opening immediately and the fluid escaping to reservoir 13 from chamber 8 before sufficient fluid has been transferred to the pressurising chamber for the quick-fill operation.

The quick-fill operation is also obtained at slow actuation rates since the restricted passage 24 defined between the confronting surfaces of the seat and valve members 15, 20 has sufficient resistance to flow that the necessary pressure to transfer fluid past the seal 5 into the pressurising chamber 7 is generated in the quick-fill chamber 8. At the same time the passage 24 allows the pressure in the quick-fill chamber to decay away so that this pressure does not resist brake application and produce a strange feel at the pedal. In addition, the passage 24 allows the braking circuit to "breathe" via the compensation port 11 during periods of non-use of the master cylinder.

When the piston is moving through the return stroke, the ball 21 of the one-way valve moves down to the illustrated position allowing fluid to flow back to the quick-fill chamber 8.

From the above it will be understood that the quick-fill operation is achieved independently of the actuation rate, whereby substantially uniform pedal travel is obtained for all conditions. There is also an added advantage in that when the valve member opens, e.g. during normal rate of actuation, the fluid flowing under pressure from the quick-fill chamber and through the valve will wash away any deposits from the surfaces of the valve and seat members which define the restricted passage 24, and automatic self-cleaning of this passage 24 is achieved.

The master cylinder illustrated in FIGS. 2 to 4 comprises a body 51 having a stepped bore with larger and smaller diameter portions 52, 53 separated by a shoulder. A piston 54 received in the bore has a first end seal 55 sliding in bore portion 52 and a rear end seal 56 sliding in bore portion 53. A low volume pressurising chamber 57 is defined in bore portion 52 in front of the piston 54, and a larger volume quick-fill chamber 58 is defined around the piston between its seals 55, 56. The body 1 has an integral boss 59, the interior of which communicates with the quick-fill chamber 58 through a port 60 and with the pressure chamber 57, when the piston is in the normal brakes off position as shown, through a compensation port 61. Connected to the outer end of the boss 59 by a seal 62 is a reservoir 63.

The boss 59 defines a valve chamber the bottom wall of which has a central spigot 80 through which the passages 60 and 61 open through a common port 81. An internal peripheral groove 82 in the boss defines an inwardly directed shoulder 83 which serves to retain a pre-assembled valve unit within the valve chamber. The valve unit comprises a valve mechanism held captured within an annular metal cage 89 having a bottom wall which sits on the bottom of the valve chamber around the spigot 80, a side wall out of which tangs 85 are struck to engage the shoulder 83 and retain the unit within the boss 59, and an inwardly directed top flange 86. The valve mechanism comprises an annular seal 87 of elastomeric material, e.g. rubber which rests on the bottom wall of the cage, a valve member 88 which is generally tubular with an external flange 89 whose lower face is substantially flat for cooperation with the seal 87 and an internal valve seat 90 at its upper end, a ball 91 held captive within the valve member by indentations 92 and cooperating with seat 90 to form a one-way valve, and a spring 93 acting between the flanges 86, 89 of the cage and valve member to urge the flange 89 into sealing contact with the seal 87.

As may be seen more clearly in FIGS. 2 and 3, the seal 87 has an upwardly and inwardly inclined lip 94 on its inner periphery for sealing around the spigot 80. On its upper surface the seal has a shallow (e.g. 1 mm) spiral groove 95 extending through nearly 360° around the seal axis, the groove being open to the inner and outer peripheries at its respective ends to communicate respectively with port 81 and with the reservoir 63 via the valve chamber. The upper surface portions 96 of the seal radially inside and outside the groove are chamfered, as seen in FIG. 4, to ensure a good sealing contact with the flange 89 of the valve member 88. A series of notches 97 are distributed around the outer periphery of the seal and serve to prevent undue distortion of the radially inner parts of the seal when it is pressed into the cage 84.

From the foregoing description it will be understood that the valve unit can be pre-assembled and correctly mounted on the master cylinder body by insertion into the boss 59 until the tangs 85 snap behind the shoulder 83.

The operation of the master cylinder is essentially the same as that described in connection with FIG. 1. When the brake pedal is depressed the piston 54 is displaced forwardly and as the volume of chamber 58 decreases fluid is transferred from this chamber to chamber 57 for taking up clearances in the braking circuit. After the clearances have been taken up the pressure increases in chamber 58 and the valve member 88 is lifted against the force of spring 93 to allow fluid to pass to the reservoir 63 from the quick-fill chamber 58. Any residual pressure in the quick-fill chamber when the valve member 88 re-engages the seal 87 can decay through the restricted passage formed by the spiral groove 95. This restricted passage also allows the pressure chamber 57 to breathe, via the compensation port 61 during periods of non-use of the brake. On the return stroke of the piston, the ball 91 of the one-way valve disengages from its seat 90 to allow fluid to flow freely from the reservoir to the quick-fill chamber.

There is no adverse effect on the master cylinder operation if any particles of dirt should happen to become trapped between the seal 87 and the valve member 88 when they are closed together. Due to the elastomeric nature of the seal material any such particles will be pressed into the surface of the seal and an effective seal will still be obtained. Thus if the next brake application is at a slow rate, the restricted passage provided by the spiral groove will still ensure that sufficient liquid is transferred to chamber 57 to obtain quick-fill operation, and any danger of all the fluid passing to the reservoir from chamber 58, thereby increasing the pedal travel, is avoided.

Various modifications are possible to the described embodiments and will occur to those readers skilled in the art. For example, in the master cylinder of FIG. 2 it is not necessary to form the groove in the seal and it could instead be provided in the valve member.

What is claimed is:

1. A master cylinder of the quick-fill type comprising a body, a bore in the body stepped to define respective bore portions, a piston received in the bore and having opposite ends slidable in said respective portions of the bore, the piston defining in the bore a low volume pressure chamber and a larger volume quick-fill chamber, a port in the body open to the quick-fill chamber and a compensation port in the body for communication with the pressure chamber, a reservoir, means connecting the reservoir to said ports and including valve means for controlling communication between the reservoir and the ports, said valve means including a pressure responsive valve arranged to open when the pressure in the quick-fill chamber reaches a predetermined level and a one-way valve permitting free flow of fluid in the direction from the reservoir to the quick-fill chamber, and wherein the pressure responsive valve comprises a valve member and seat having annular, co-operating confronting substantially parallel surfaces, the seat having an opening at the center of the annular surface thereof communicating with said ports, and said confronting surfaces moving apart when the valve opens to allow fluid to flow therebetween in a direction substantially parallel to the said surfaces, and a groove is provided in one of said confronting surfaces and extends along a substantially spiral path, said groove defining a flow restricting by-pass passage between said confronting surfaces when said pressure responsive valve is closed.

2. A master cylinder according to claim 1, wherein one of said confronting surfaces is provided by an element of elastomeric material.

3. A master cylinder according to claim 2 wherein said element constitutes the annular valve seat of the pressure responsive valve, the body has a projection with an axial opening therein, said opening being connected to said ports, and said element extends around said projection in sealing contact therewith.

4. A master cylinder according to claim 1 wherein the groove is provided in an annular elastomeric element, said element constituting the seat of the pressure responsive valve, the body has an opening communicating with the ports, and the element seals against the body around said opening.

5. A master cylinder according to claim 1 wherein a cage is provided and accommodates the valve means, a spring is interposed between the cage and the valve member of the pressure responsive valve for urging the confronting surfaces of the valve member and seat of the pressure responsive valve into engagement and the master cylinder body has a valve chamber through which the reservoir and ports communicate, the cage with the spring and valve means being pre-assembled together and inserted as a unit into said valve chamber.

6. A master cylinder according to claim 5, wherein an abutment is provided on the wall of the valve chamber and the cage is provided with resilient projections adapted to engage behind said abutment to secure the valve unit in place on insertion into the chamber.

7. The master cylinder of claim 1, wherein said groove is open at one end to said opening in said seat and extends spirally to the outer edge of said one confronting surface.

* * * * *